(12) United States Patent
Hu

(10) Patent No.: US 7,089,756 B2
(45) Date of Patent: Aug. 15, 2006

(54) SYSTEM AND METHOD OF REFRIGERATING AT LEAST ONE ENCLOSURE

(75) Inventor: Ben P. Hu, Lynnwood, WA (US)

(73) Assignee: The Boeing Company, Chicago, IL (US)

(*) Notice: Subject to any disclaimer, the term of this patent is extended or adjusted under 35 U.S.C. 154(b) by 234 days.

(21) Appl. No.: 10/649,716

(22) Filed: Aug. 26, 2003

(65) Prior Publication Data
US 2004/0159118 A1 Aug. 19, 2004

Related U.S. Application Data

(63) Continuation-in-part of application No. 10/641,415, filed on Aug. 15, 2003, and a continuation-in-part of application No. 10/369,441, filed on Feb. 19, 2003.

(51) Int. Cl.
*F25D 17/02* (2006.01)
(52) U.S. Cl. ............................ 62/435; 62/99; 62/430
(58) Field of Classification Search ............... 62/435, 62/3.7, 3.3, 430, 438, 239, 99, 238.6, 244; 165/41, 104.34
See application file for complete search history.

(56) References Cited

U.S. PATENT DOCUMENTS

| | | | |
|---|---|---|---|
| 4,969,509 | A | 11/1990 | Merensky |
| 5,307,642 | A | 5/1994 | Dean |
| 5,369,960 | A | 12/1994 | Mueller et al. |
| 5,423,498 | A | 6/1995 | Fluegel |
| 5,513,500 | A | 5/1996 | Fischer et al. |
| 5,667,168 | A | 9/1997 | Fluegel |
| 5,702,073 | A | 12/1997 | Fluegel |
| 5,711,155 | A | 1/1998 | DeVilbiss et al. |
| 5,816,063 | A | 10/1998 | Schulak et al. |

(Continued)

FOREIGN PATENT DOCUMENTS

JP 2001 010595 A 5/2001

(Continued)

OTHER PUBLICATIONS

Zafer Ure; *Eutectic Thermal Energy Storage Concept*; IEA Annex 10, Phase Charge Materials and Chemical Reactions for Thermal Energy Storage First Workshop; Apr. 1998; pp. 57-67; Adana, Turkey. Available at <http://www.ket.kth.se/Avdelningar/ts/annex10/WS_pres/ure_proc-final.pdf>.

(Continued)

*Primary Examiner*—Chen Wen Jiang
(74) *Attorney, Agent, or Firm*—Alston & Bird LLP

(57) ABSTRACT

A system and method are provided for refrigerating at least one enclosure, such as an aircraft galley cart. The system includes at least one air-to-liquid heat exchanger, an eutectic thermal battery, a liquid-to-direct heat exchanger and at least one liquid-to-direct heat pump. The air-to-liquid heat exchangers are in thermal communication with the interiors of the enclosures. The thermal battery is in fluid communication with the air-to-liquid heat exchangers via a first coolant loop. The liquid-to-direct heat exchanger and the liquid-to-direct heat pumps are in fluid communication with the eutectic thermal battery via a second coolant loop, and in thermal communication with a cold heat sink, such as an aircraft fuselage skin structure. The system can controllably operate in direct passive, indirect passive, direct active and/or an indirect active modes whereby a coolant can selectively flow in the first and/or second coolant loops to thereby refrigerate the enclosures.

9 Claims, 8 Drawing Sheets

U.S. PATENT DOCUMENTS

| | | | |
|---|---|---|---|
| 5,871,041 A | 2/1999 | Rafalovich et al. | |
| 6,059,016 A | 5/2000 | Rafalovich et al. | |
| 6,209,343 B1 | 4/2001 | Owen | |
| 6,484,794 B1 | 11/2002 | Schulak et al. | |

FOREIGN PATENT DOCUMENTS

| | | |
|---|---|---|
| JP | 2001-263898 A | 9/2001 |
| JP | 02001330280 A | 11/2001 |
| WO | WO 2004/074750 A | 9/2004 |

OTHER PUBLICATIONS

The Internet: http://www.supercool.se/pages/calculate.html; *How to calculate your cooling requirements;* Downloaded: Mar. 7, 2003.

The Internet: http://www.supercool.se/pages/al.html; *Thermoelectric Air-to-Liquid systems;* Downloaded: Aug. 15, 2003.

The Internet: http://www.thermacore.com/embedded_heat_pipe.htm; *Embedded Heat Pipe;* Downloaded: Aug. 15, 2003.

The Internet: http://www.supercool.se/pages/productcode.html; *How to design your own thermoelectric system;* Downloaded: Aug. 15, 2003.

The Internet: http://www.supercool.se/pages/aa.html; *Thermoelectric Air-to-Air systems;* Downloaded: Aug. 15, 2003.

The Internet: http://www.supercool.se/pages/da.html; *Thermoelectric Direct-to-Air systems;* Downloaded: Aug. 15, 2003.

The Internet: http://www.supercool.se/pages/dl.html; *Thermoelectric Direct-to-Liquid systems;* Downloaded: Aug. 15, 2003.

The Internet: http://www.supercool.se/pages/la.html; *Thermoelectric Liquid-to-Air systems;* Downloaded: Aug. 15, 2003.

The Internet: http://www.supercool.se/pages/ll.html; *Thermoelectric Liquid-to-Liquid systems;* Downloaded: Aug. 15, 2003.

Dale Mehl; *Vapor Chamber Heat Sinks Eliminate Hot Spots;* Available at http://www.thermacore.com/pdfs/vapor.pdf; Downloaded: Aug. 15, 2003.

The Internet: http://www.aavidthermalloy.com/technical/papers/aircooled.shtml; *Augmented-Fin Air-Cooled Heat Sinks;* Downloaded: Mar. 10, 2003.

The Internet: http://www.aavidthermalloy.com/products/bondfin/augfin.shtml; *Augmented Surface;* Downloaded: Mar. 10, 2003.

PCT International Search Report filed on Form PCT/ISA/210, International Application No. PCT/US2004/025760,International Filing Date Oct. 8, 2004, File Reference 03-1055, Applicant—The Boeing Company.

SYSTEM AND METHOD OF REFRIGERATING AT LEAST ONE ENCLOSURE

CROSS-REFERENCES TO RELATED APPLICATIONS

This application is a continuation-in-part of copending U.S. patent application Ser. No. 10/369,441, filed on Feb. 19, 2003, and U.S. patent application Ser. No. 10/641,415, filed on Aug. 15, 2003, each of which is hereby incorporated herein in its entirety by reference.

FIELD OF THE INVENTION

The present invention relates generally to systems and methods of refrigerating enclosures and, more particularly, relates to systems and methods of refrigerating enclosures capable of integrating passive and active cooling techniques.

BACKGROUND OF THE INVENTION

In many industries employing refrigeration systems, such as the airline, trucking, shipping and building industries, conventional refrigeration technology is based on the vapor-compression cycle. In aircraft, for example, a vapor-compression cycle air chiller is typically mounted either on top of a galley of the aircraft, such as in the crown area, or below the cabin floor, such as in the cargo area between floor beams. To cool consumables such as food and beverages, the air chiller is typically connected to one or more galley food storage compartments via a series of air supply/return ducts, which collectively form a closed-loop system. In operation, the air chiller is essentially a unitized air conditioner similar in principle to the conventional window-unit air conditioners typically mounted in a window of a house. The objective is to maintain the temperature of the consumables between 0° C. and 7° C., or between 0° C. and 5° C. (or 4° C. in many European countries) as may be required in the future.

In order to maintain the consumables at a temperature within the proper temperature range, a desired temperature difference must exist between the warmer aircraft cabin atmosphere and the cooler galley food storage compartments atmosphere. This temperature difference causes heat energy in the warmer aircraft cabin to flow into the cooler galley food storage compartments via a combination of heat transfer mechanisms. Conventionally, the rate of this heat transfer (or heat load) at any given temperature differential is governed by the effective net insulation between the warm and the cool atmospheres. In this regard, the vapor-compression cycle air chiller typically must be able to remove this heat load from the cooler food storage compartments in order to maintain the desired temperature differential, thereby keeping the consumables at a temperature within the proper temperature range. The heat removed by the air chiller is rejected to the atmosphere in either the airplane cargo compartment or the cabin crown, depending on the location of the air chiller.

Conventionally, the vapor-compression cycle air chiller is an air-to-air system. In this regard, a fan in the air chiller unit circulates air from the galley food storage compartments via the air return ducts through an evaporator coil mounted inside the air chiller. Inside the evaporator coil, cold coolant, such as cold R134a refrigerant (gas phase), soaks up the heat from the air flowing across the evaporator coil. As the air flows across the evaporator coil, the air loses heat energy to the coolant. The cold air is then circulated back into the galley food storage compartments via the air supply ducts. Once inside the galley food storage compartments, the cold air soaks up the heat energy inside the food storage compartments. The process can then be repeated in a continuous manner in order to maintain the desired temperature differential.

As will be appreciated, once the coolant receives the heat energy from the air flowing across the evaporator coil, the heat energy must be rejected from the coolant. In this regard, the gaseous coolant becomes superheated as it soaks up the heat energy through the evaporator coil. The superheated gaseous coolant is then typically drawn into a compressor within the air chiller. The compressor then does work on the gaseous coolant by forcing the gaseous coolant into a smaller volume by applying external pressure. As a result, the temperature and pressure of the gaseous coolant is greatly increased. The high temperature and pressure gaseous refrigerant is then circulated through a condenser located in the air chiller unit. As the gaseous refrigerant flows through the condenser coil, a fan blows ambient air across the condenser coil to cool the hot, gaseous refrigerant. As the refrigerant circulates through the condenser coil, it loses heat energy to the ambient air such that the refrigerant changes state from a high-pressure, super-heated gas to a saturated high pressure liquid as it leaves the condenser coil and enters a liquid receiver. The liquid refrigerant travels through the high-pressure liquid line to an expansion valve (or in some systems, a capillary tube) and is expanded into a saturated gas before it re-enters the evaporator coil.

Whereas refrigeration systems employing vapor-compression cycle air chillers are adequate for maintaining consumables at a temperature within the proper temperature range, such refrigeration systems have drawbacks. In this regard, the heart of the vapor-compression cycle air chiller is the compressor. Operation of the compressor as well as the fan blowing air across the condenser, however, undesirably consumes significant amounts of electrical energy. Also, the compressor is typically a complicated mechanical device, which is noisy and prone to failure. In addition, operation of the air-chiller rejects heat into the cabin environment, which can be problematic for the environmental control system (ECS) during ground operations. In this regard, ECS packs that provide cooling to the airplane cabin and equipment during ground operation are typically located under the airplane wing box, which stores airplane fuel. As such, the harder the ECS system has to work in hot climates, the more heat the ECS system rejects into the airplane fuel. Rejecting heat into the airplane fuel may cause undesirable fuel vaporization in a partially full fuel tank which, in some instances, has been linked to incidents of airplanes exploding on the ground due to vaporized fuel being ignited by sparks from malfunctioning fuel pumps.

SUMMARY OF THE INVENTION

According to embodiments of the present invention, a system and method are provided that are capable of refrigerating one or more enclosures utilizing the "free" thermal potential provided by the natural cold heat sink of a vehicle or system with which the system is operated. Many vehicles and systems in operation today include natural cold heat sinks capable of absorbing heat from various sources. In the aircraft industry, for example, during normal cruising flight at high altitude, the ambient atmosphere temperature outside the aircraft can range from −33° F. to approximately −100° F. The aircraft skin temperature correspondingly ranges from +16° F. to −59° F. As a result, the skin structure of the aircraft, such as the fuselage skin structure, can reach temperatures far below the internal aircraft cabin temperature, which is generally maintained at approximately +70° F.

The system and method of embodiments of the present invention are based on a hybrid refrigeration methodology capable of integrating passive and active cooling technologies to provide continuous refrigeration to enclosures, such as aircraft galley carts. Advantageously, the systems and methods of embodiments of the present invention are capable of achieving an optimal balance between the refrigeration capability of the system and the changing operational environment of the cold heat sink. As such, the system and method can refrigerate enclosures, such as galley carts on aircraft, without the use of a vapor-compression-cycle air chiller, thereby avoiding the drawbacks of vapor-compression-cycle air chillers.

According to one aspect of the present invention, a system is provided for refrigerating at least one enclosure, such as an aircraft galley cart. The system includes at least one air-to-liquid heat exchanger in thermal communication with the interiors of the enclosures. The system also includes an eutectic thermal battery (a cold storage device) in fluid communication with the air-to-liquid heat exchangers via a first coolant loop. In turn, the system includes a liquid-to-direct heat exchanger in fluid communication with the eutectic thermal battery via a second coolant loop. Advantageously, the liquid-to-direct heat exchanger is also in thermal communication with a cold heat sink, such as an aircraft fuselage skin structure. Also in thermal communication with the cold heat sink and fluid communication with the eutectic thermal battery, the system includes at least one liquid-to-direct heat pump.

The system is capable of controllably operating in a direct passive mode, an indirect passive mode, a direct active mode and/or an indirect active mode whereby a coolant is capable of selectively flowing in the first and/or second coolant loops through the air-to-liquid heat exchangers, the eutectic thermal battery, the liquid-to-direct heat exchanger and/or the liquid-to-direct heat pumps. In this regard, the system can additionally include a plurality of valves capable of controlling the flow of coolant in the first and second coolant loops. Further, the system can include first and second coolant pumps that are capable of driving the coolant in the first and second coolant loops, respectively.

When the system operates in the indirect passive mode, the air-to-liquid heat exchangers are capable of placing the coolant in the first coolant loop in thermal communication with interiors such that the coolant can carry heat away from the interiors. The eutectic thermal battery can then receive the coolant from the air-to-liquid heat exchangers, and then absorb the heat carried away by the coolant, such as via a phase change material in the eutectic thermal battery. The liquid-to-direct heat exchanger can thereafter receive the coolant in the second coolant loop such that the cold heat sink can absorb the heat carried by the coolant.

In operation in direct passive mode, the air-to-liquid heat exchangers are capable of placing the coolant in the first coolant loop in thermal communication with interiors such that the coolant can carry heat away from the interiors. The coolant in the first coolant loop can then be received by the second coolant loop, and thereafter be received by the liquid-to-direct heat exchanger. The liquid-to-direct heat exchanger can thereafter receive the coolant in the second coolant loop such that the cold heat sink can absorb the heat carried by the coolant.

When the system operates in the direct active mode, the air-to-liquid heat exchangers are capable of placing the coolant in the first coolant loop in thermal communication with the interiors of the enclosures such that the coolant can carry heat away from the interiors. The liquid-to-direct heat pumps can then reject the heat carried by the coolant in the first coolant loop to the cold heat sink. In an alternative embodiment, the system further includes (or have access to) a store of a pressurized inert composition, such as Nitrogen. In this embodiment, the eutectic thermal battery includes an evaporator coil in variable fluid contact with the store. Also in this embodiment, when the system operates in the direct active mode the eutectic thermal battery is capable of receiving the coolant from the air-to-liquid heat exchangers, and thereafter absorbing the heat carried away by the coolant in the first coolant loop. The pressurized inert composition can then be expanded into the evaporator coil, such as a low temperature vapor, to thereby carry away the heat absorbed by the eutectic thermal battery. After the pressurized inert composition absorbs heat from the phase change material within the eutectic thermal battery, the inert composition can exit the eutectic thermal battery, such as through a vapor line that can eject the inert composition from the airplane.

When the system operates in the indirect active mode, coolant in the second coolant loop is capable of being placed in thermal communication with the eutectic thermal battery such that the coolant carries heat away from the eutectic thermal battery. The liquid-to-direct heat pumps can then be capable of rejecting the heat carried by coolant in the second coolant loop.

In various embodiments, the first and/or second coolant loops are closed loops. Therefore, for example, when the first coolant loop is a closed loop and the system is operating in the indirect passive mode, the air-to-liquid heat exchangers are capable of receiving the coolant from the eutectic thermal battery after the heat has been absorbed from the coolant. Similarly, when the second coolant loop is a closed loop and the system is operating in the indirect passive mode, the eutectic thermal battery is capable of receiving the coolant from the liquid-to-direct heat exchanger after the cold heat sink absorbs the heat carried away by the coolant. When the second coolant loop is a closed loop and the system is operating in the indirect active mode, for example, the eutectic thermal battery is capable of receiving the coolant from the liquid-to-direct heat pumps after the liquid-to-direct heat pumps reject the heat carried by the coolant to the cold heat sink.

A method of refrigerating at least one enclosure is also provided.

BRIEF DESCRIPTION OF THE DRAWINGS

Figure 1:
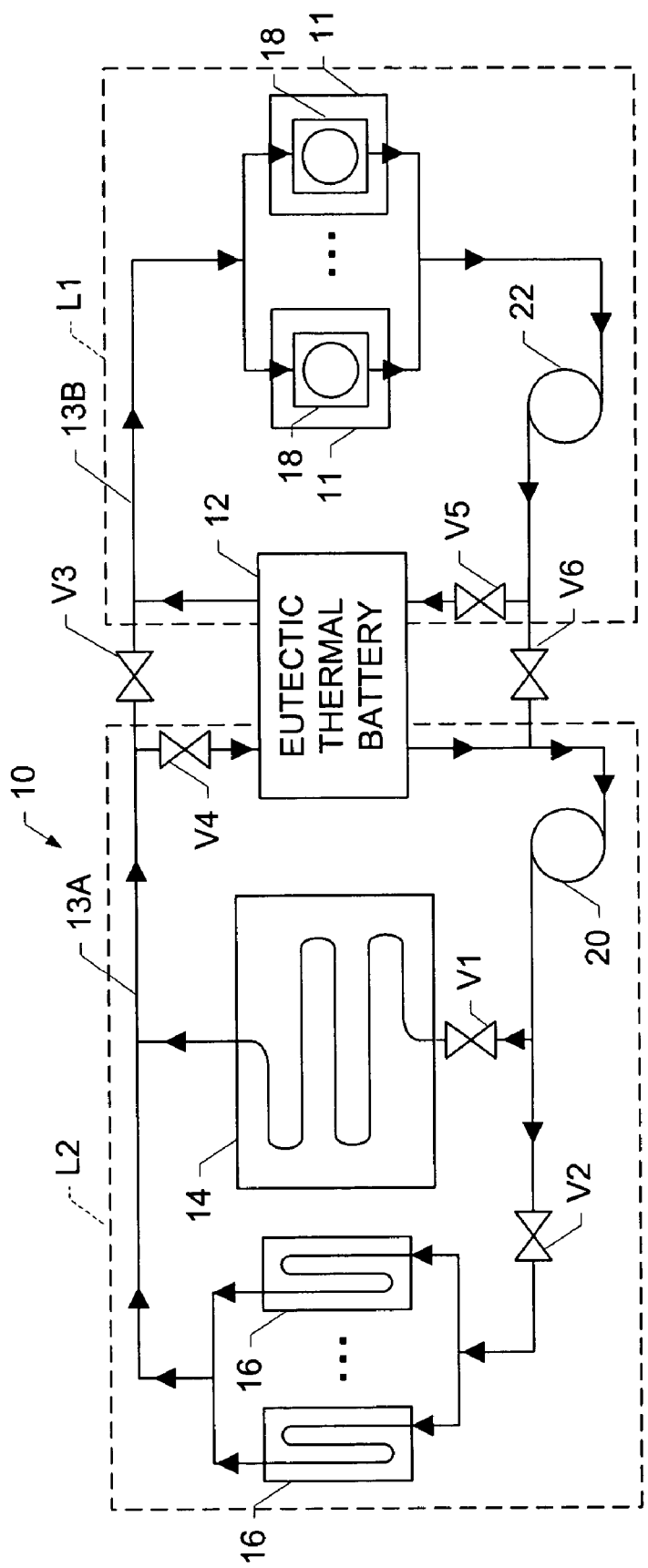
Figure 2:
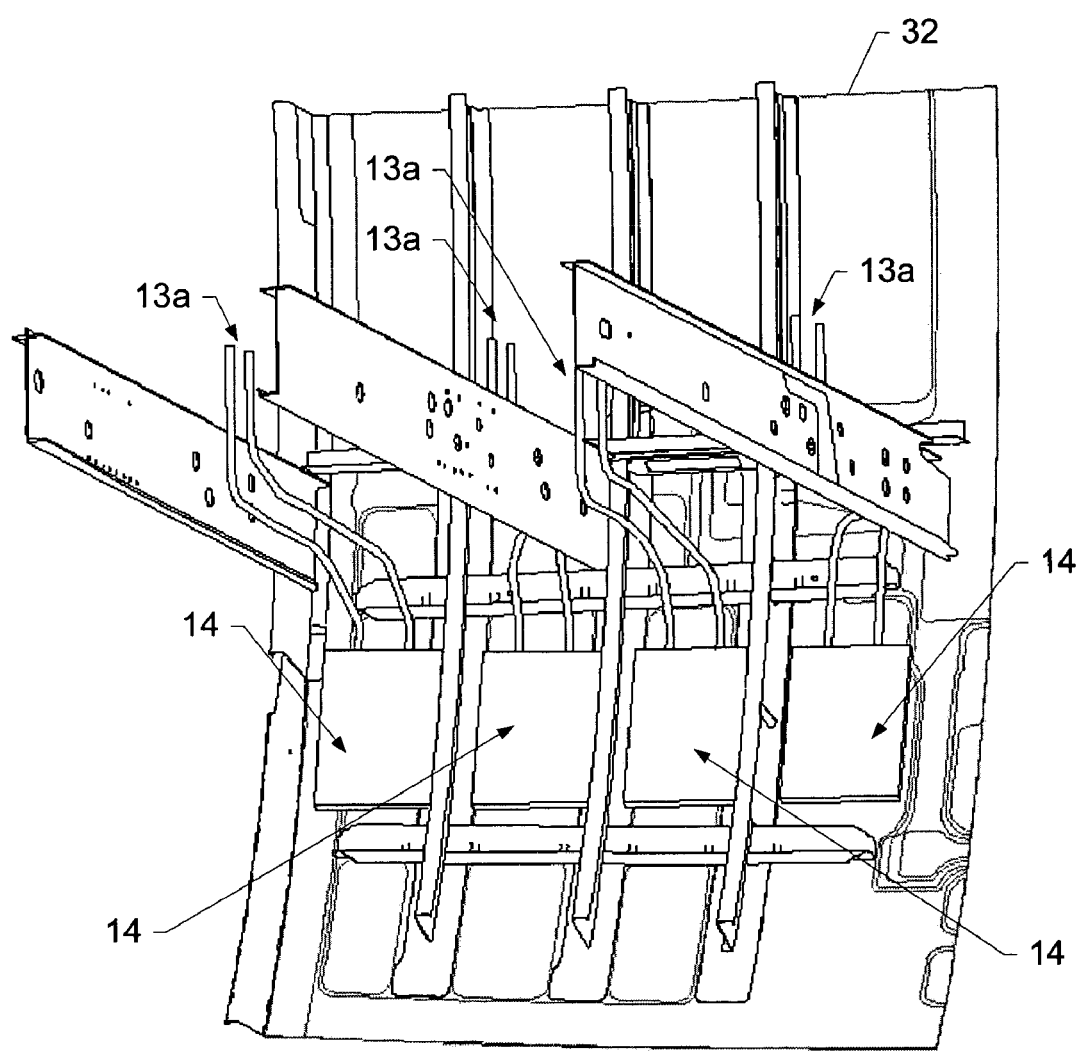
Figure 3:
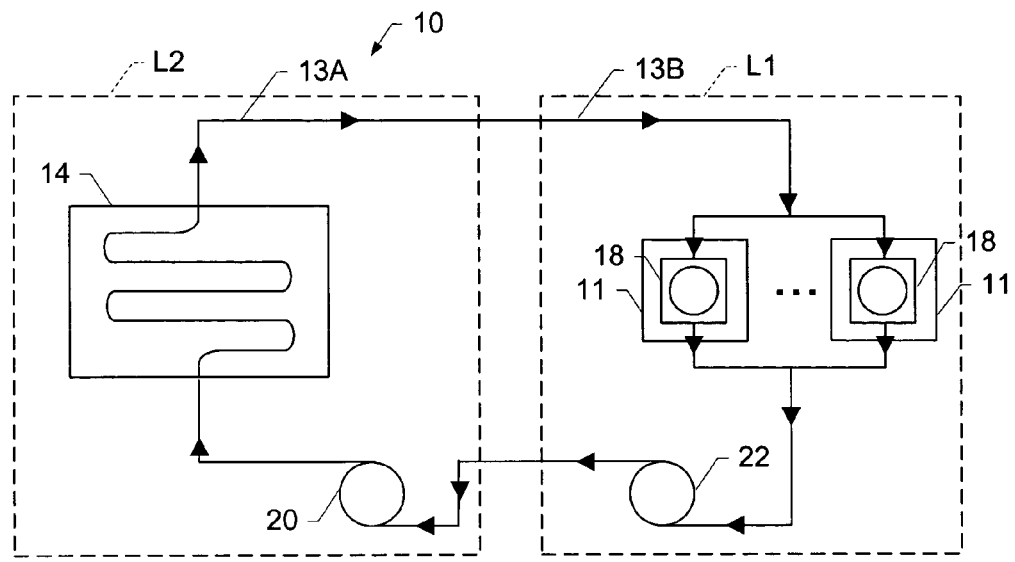
Figure 4:
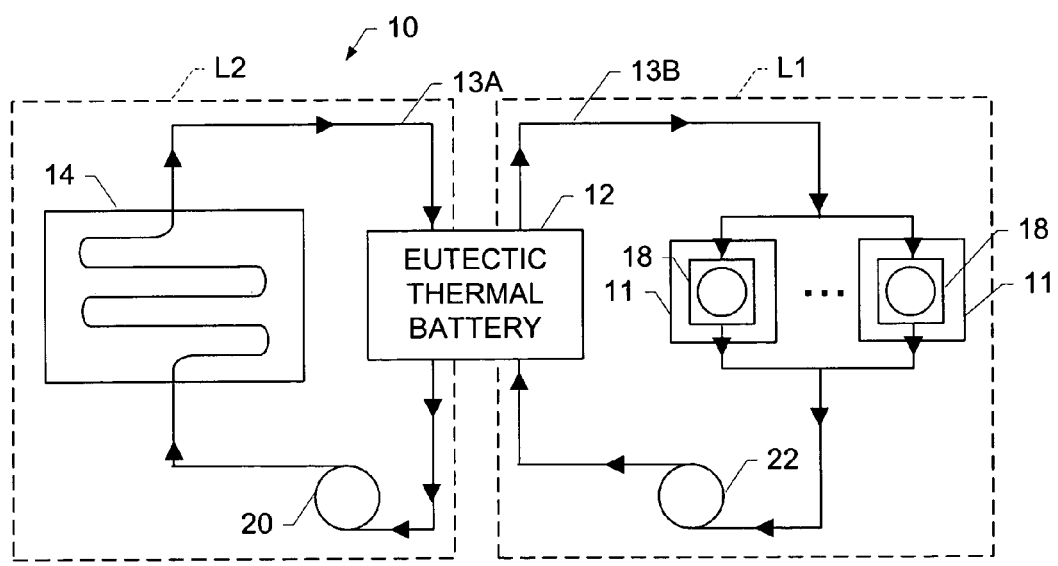
Figure 5:
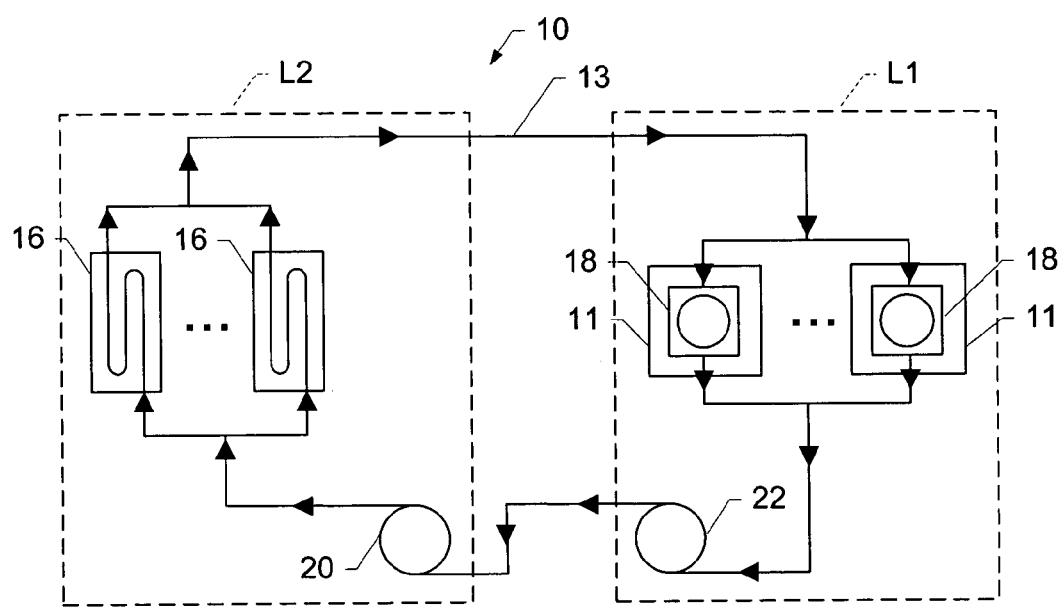
Figure 6:
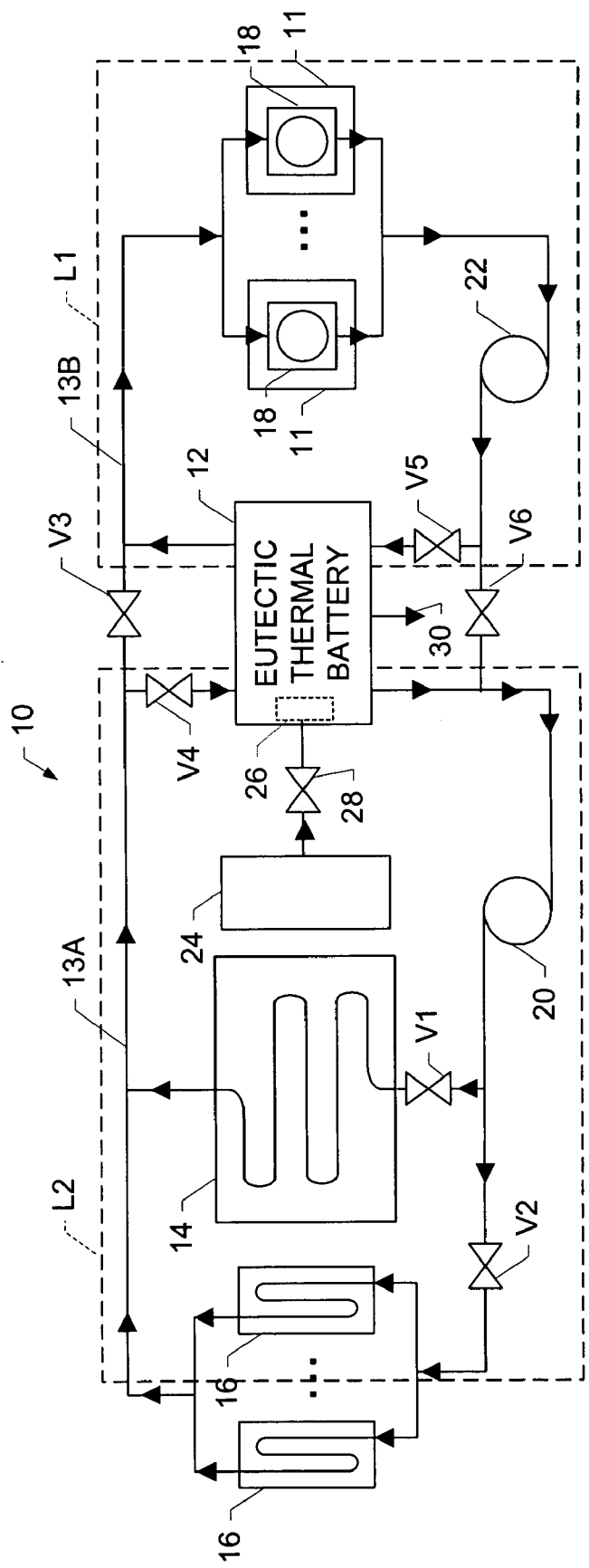
Figure 7:
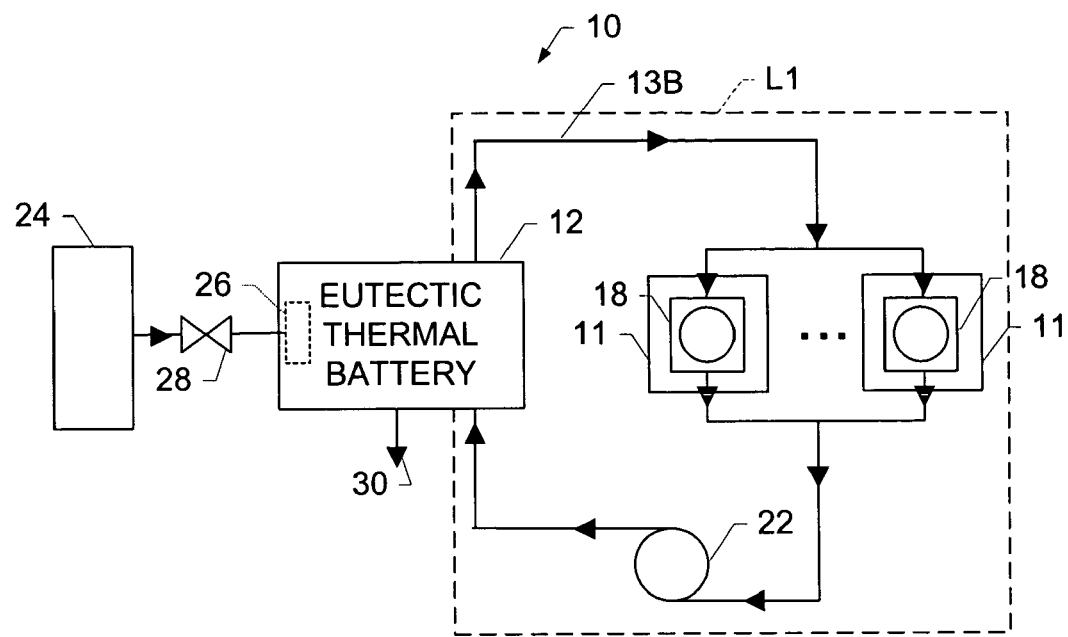
Figure 8:
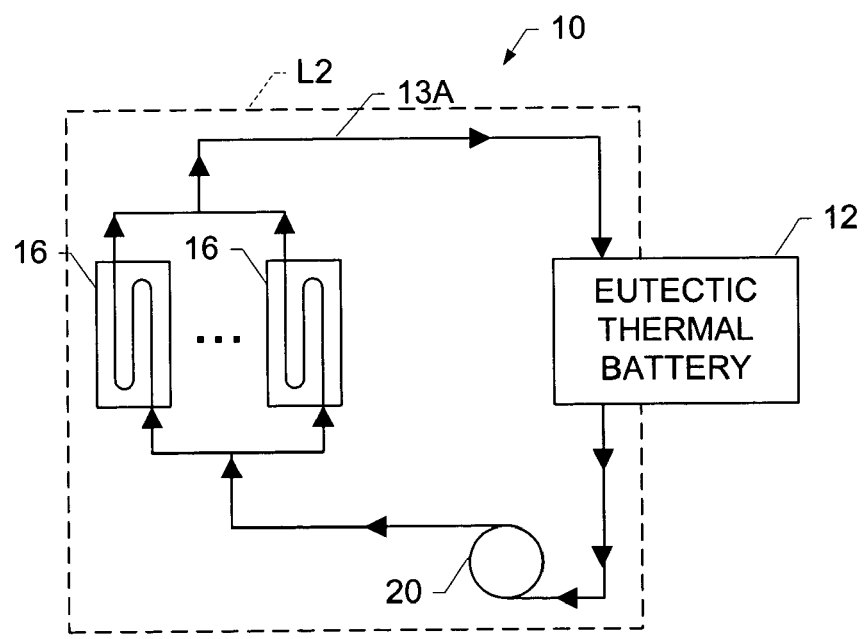
Figure 9:
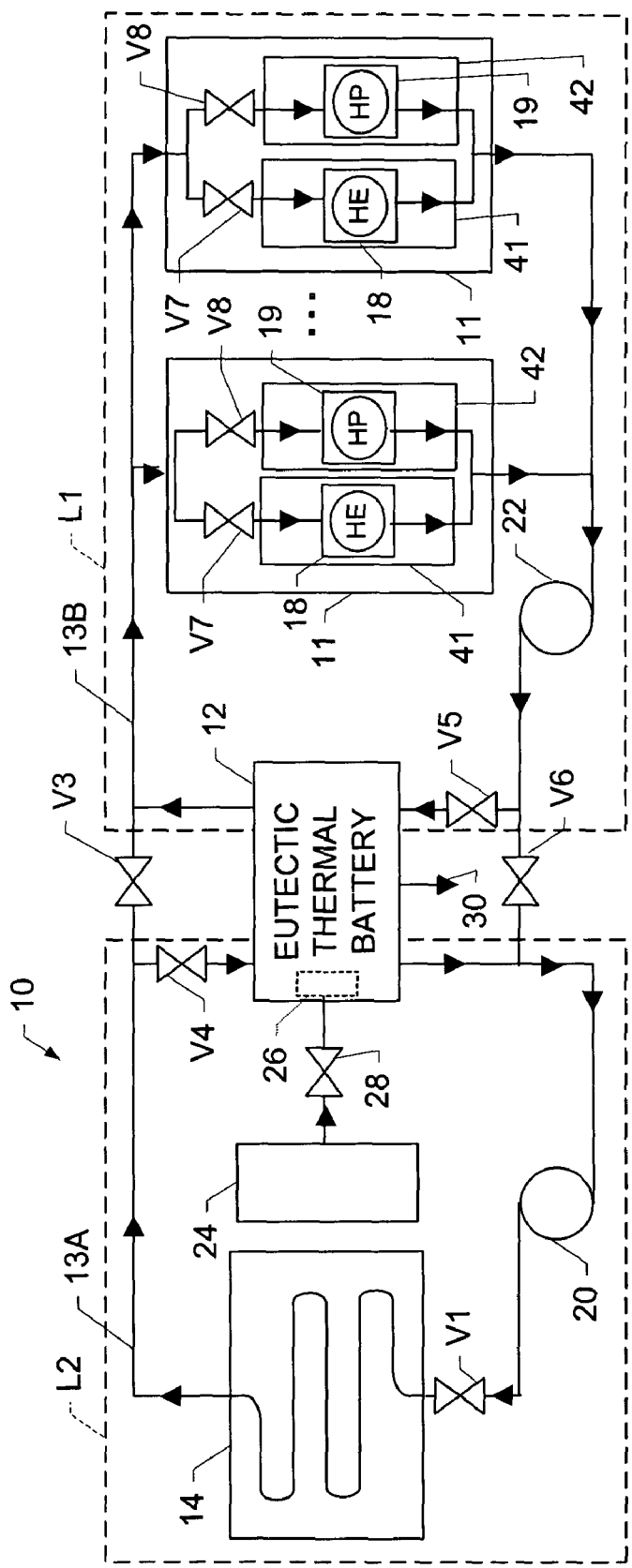
Figure 10:
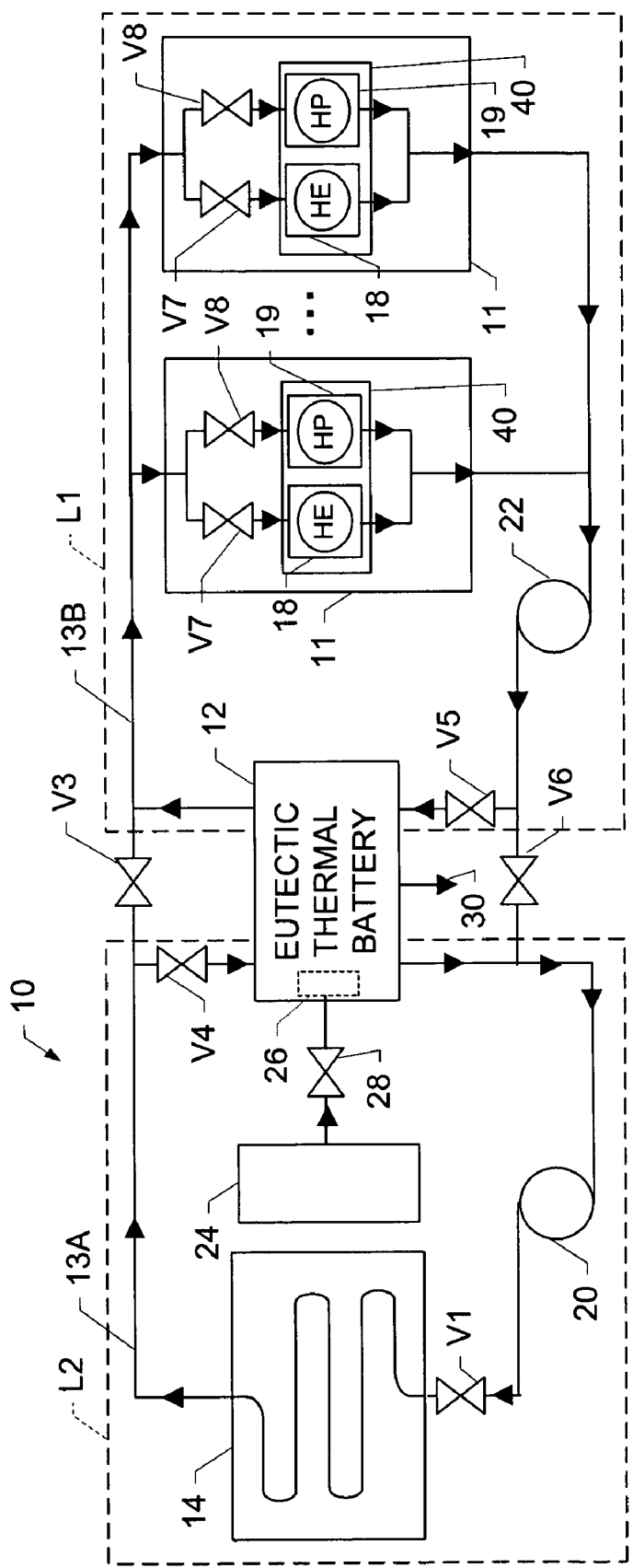

Having thus described the invention in general terms, reference will now be made to the accompanying drawings, which are not necessarily drawn to scale, and wherein:

FIG. 1 is a schematic block diagram of a system for refrigerating at least one enclosure according to one embodiment of the present invention;

FIG. 2 illustrates various elements of a system for refrigerating at least one enclosure according to one embodiment of the present invention, where the system is utilized in an aircraft having a cold heat sink comprising at least a portion of the aircraft fuselage skin structure;

FIG. 3 is a schematic block diagram of a system for refrigerating at least one enclosure in a direct passive mode according to one embodiment of the present invention;

FIG. 4 is a schematic block diagram of a system for refrigerating at least one enclosure in an indirect passive mode according to one embodiment of the present invention;

FIG. 5 is a schematic block diagram of a system for refrigerating at least one enclosure in a direct active mode according to one embodiment of the present invention;

FIG. 6 is a schematic block diagram of a system for refrigerating at least one enclosure according to another embodiment of the present invention;

FIG. 7 is a schematic block diagram of a system for refrigerating at least one enclosure in a direct active mode according to another embodiment of the present invention;

FIG. 8 is a schematic block diagram of a system for refrigerating at least one enclosure in an indirect active mode according to one embodiment of the present invention;

FIG. 9 is a schematic block diagram of a system for refrigerating at least one enclosure in a direct active mode according to yet another embodiment of the present invention; and FIG. 10 is a schematic block diagram of a system for refrigerating at least one enclosure in a direct active mode according to yet another embodiment of the present invention, wherein each enclosure includes a common heat sink for communicating with a heat exchanger and a heat pump.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Embodiments of the present invention provide a system and method of refrigerating at least one enclosure. As described herein, the system and method are utilized within an aircraft to refrigerate one or more galley food storage compartments. The system and method are therefore particularly advantageous for cooling consumables, such as food and beverages, in an aircraft. It should be appreciated, however, that the system and method can be utilized in other vehicles or with other systems, without departing from the spirit and scope of the present invention. In this regard, the system and method can be utilized in any of a number of other vehicles or with other systems capable of providing a cold heat sink in a manner similar to that described below.

Advantageously, embodiments of the present invention are capable of operating in a number of different modes to provide the most cost effective and efficient refrigeration of the enclosure(s). In this regard, embodiments of the present invention are capable of operating with an already existing cold heat sink in the vehicle or other system within which the invention is utilized to provide passive refrigeration of the enclosure(s). As utilized in aircraft, for example, the system is capable of operating with the aircraft fuselage skin structure acting as the cold heat sink.

Typically, the temperature of the fuselage skin structure of an aircraft during normal high altitude cruising is between approximately +16° F. and −59° F. Such a super cold skin temperature enables the fuselage skin to function as a powerful cold heat sink. Thus, when the fuselage skin has a temperature low enough to act as a cold heat sink, such as during flight, embodiments of the present invention can passively refrigerate the enclosures by utilizing the fuselage skin. When the fuselage skin does not have a temperature low enough to provide an effective heat sink, such as while an aircraft is on the ground, embodiments of the present invention are capable of actively and/or passively refrigerating the enclosures. Embodiments of the present invention can therefore provide continuous refrigeration of the enclosures until such time as the temperature of the fuselage skin decreases to a point that the fuselage skin can act as an effective heat sink.

Reference is now made to FIG. 1, which illustrates a system 10 for refrigerating at least one enclosure 11 according to one embodiment of the present invention where the system operates within an aircraft, and where the enclosures comprise galley food storage compartments. It should be appreciated, however, that even operating the system within an aircraft, the enclosures can comprise any of a number of other enclosures without departing from the spirit and scope of the invention. As shown, the system includes an eutectic thermal battery 12, a liquid-to-direct heat exchanger 14, at least one liquid-to-direct heat pump 16 and at least one air-to-liquid heat exchanger 18. In addition, the system includes a plurality of valves, such as valves V1, V2, V3, V4, V5 and V6, as well as coolant pumps 20 and 22, that allow coolant to pass through various of the other elements of the system during various modes of operation, as described below. Although not shown for clarity, it will be appreciated by those skilled in the art that the coolant pumps will typically also include coolant reservoirs for proper operation of the coolant pumps. To allow coolant to pass through various of the other elements, the valves are connected to coolant ducts 13, pipes or the like that interconnect the elements of the system. The coolant can comprise any of a number of different coolants such as, for example, 3M Novec Engineered Fluids manufactured by 3M Specialty Materials of St. Paul, Minn.

The eutectic thermal battery 12 functions within the system 10 as a thermal energy capacitor. More particularly, in one embodiment, the eutectic thermal battery comprises a highly-insulated, two-pass cold-holding plate that contains a phase change material that has a predetermined freezing point. The phase change material can comprise any of a number of different materials having any of a number of different freezing points, such as between 0° C. and −40° C. As indicated above in the context of aircraft, the super cold temperature of the fuselage skin enables the fuselage skin to function as a powerful cold heat sink. As such, the fuselage skin structure can be utilized to rapidly absorb latent heat from the phase change material inside the eutectic thermal battery, as described below. When the phase change material looses its latent heat to the cold heat sink, it changes phase from a liquid to a solid-liquid mixture and eventually to a pure solid once all the latent heat is given up. Typically, the latent heat transfer takes place isothermally at a temperature between 0° C. and −40° C. Therefore, the phase change material can be selected as desired to have a freezing temperature capable of refrigerating the enclosures to within a desired temperature range. In one embodiment, for example, the phase change material comprises PlusICE E-12 phase change material manufactured by Environmental Process Systems Limited of the United Kingdom. The PlusICE E-12 phase change material has a freezing point of −11.6° C.

The system includes a series of ducts 13 arranged in one of two closed-loop paths (designated L1 and L2) through which coolant flows between and through various of the system elements. More particularly, the eutectic thermal battery 12 contains two separate internal coolant loops. One of the coolant loops provides heat transfer between the eutectic thermal battery and the air-to-liquid heat exchangers 18 via loop L1. The air-to-liquid heat exchangers act to carry heat out of the enclosures 11. In this regard, the air-to-liquid heat exchangers are disposed in thermal contact with the interior of the enclosures, such as by being mounted within the enclosures. The system can include any number of air-to-liquid heat exchangers and, in one embodiment, the system includes one air-to-liquid heat exchanger in each enclosure to be refrigerated. The air-to-liquid heat exchangers can comprise any of a number of different devices known to those skilled in the art. For example, the air-to-liquid heat exchangers can comprise any of a number of air-to-liquid heat exchangers manufactured by Lytron of Woburn, Mass.

In addition to the coolant loop providing heat transfer between the eutectic thermal battery 12 and the air-to-liquid heat exchangers 18, the eutectic thermal battery includes a second internal loop L2. The second internal coolant loop provides heat transfer between the eutectic thermal battery and the liquid-to-direct heat exchanger 14, or between the eutectic thermal battery and the liquid-to-direct heat pumps 16. The liquid-to-direct heat exchanger and the liquid-to-direct heat pumps can be located in any number of different locations in thermal contact with a cold heat sink, typically a cold heat sink of a vehicle or other system employing the system 10. In this regard, the liquid-to-direct heat exchanger and the liquid-to-direct heat pumps can be disposed in thermal contact with the cold heat sink in any of a number of different manners.

In one embodiment, for example, the liquid-to-direct heat exchanger 14 and the liquid-to-direct heat pumps 16 are disposed in thermal contact with the cold heat sink by placing the liquid-to-direct heat exchanger and the liquid-to-direct heat pumps in physical contact with the cold heat sink. In embodiments where the system is utilized in an aircraft, for example, the liquid-to-direct heat exchanger and the liquid-to-direct heat pumps can be mounted in physical, and thus thermal, contact with the aircraft fuselage skin structure. In this regard, reference is made to FIG. 2, which illustrates four liquid-to-direct heat exchangers 14 mounted in physical contact with a portion of an aircraft fuselage skin structure 32, such as in the location of the forward galley complex of the aircraft.

The liquid-to-direct heat exchanger 14 is sized to have the cooling capacity required to accommodate the total heat load from all of the air-to-liquid heat exchangers 18, as well as the capacity to remove the required latent heat to freeze the phase change material in the eutectic thermal battery 12 within a desirable time period when the cold heat sink is capable of passively absorbing the heat from the coolant, such as during high altitude flight. As will be appreciated, however, the system 10 can include multiple liquid-to-direct heat exchangers that collectively have the required cooling capacity. The liquid-to-direct heat exchanger can comprise any of a number of different devices as such are known to those skilled in the art such as, for example, any of a number of cold plates manufactured by Lytron. In one advantageous embodiment, the shape of the liquid-to-direct heat exchanger is preferably designed to fit the contour of the cold heat sink (e.g., fuselage skin structure), as shown in FIG. 2. By fitting the shape of the liquid-to-direct heat exchanger to the contour of the cold heat sink, the liquid-to-direct heat exchanger can be in better thermal contact with the cold heat sink.

Like the liquid-to-direct heat exchanger 14, the liquid-to-direct heat pumps 16 are sized to have the collective cooling capacity required to accommodate the total heat load from all of the air-to-liquid heat exchangers 18. In this regard, the system 10 can include any number of liquid-to-direct heat pumps. As will be appreciated, however, the system can include a single liquid-to-direct heat pump that has the required cooling capacity. The liquid-to-direct heat pumps can comprise any of a number of different devices as such are known to those skilled in the art. In this regard, the liquid-to-direct heat pumps can comprise any of a number of different thermoelectric or thermionic liquid-to-direct heat pumps, as such are known to those skilled in the art. For example, the liquid-to-direct heat pumps can comprise any of a number of different liquid-to-direct heat pumps manufactured by Supercool AB of Göteborg, Sweden. Also like the liquid-to-direct heat exchanger, the shape of the liquid-to-direct heat pumps in one advantageous embodiment are designed to fit the contour of the cold heat sink (e.g., fuselage skin structure) such that the liquid-to-direct heat pumps can be in better thermal contact with the cold heat sink.

As indicated above, the system 10 is capable of operating in a number of different modes to provide continuous refrigeration to the enclosures 11. Typically, the system is capable of operating in one of four modes, direct passive, indirect passive, direct active or indirect active. Depending on the mode of operation, coolant flows throughout the system in various manners while being driven by the coolant pumps 20 and 22, which can comprise variable or constant-speed coolant pumps. To control the mode of operation, and thus the flow path of the coolant, the valves V1–V6 are open and shut in various combinations. In one embodiment, then, the valves can comprise remote-controlled shut-off valves. As will be appreciated, the mode of operation can be selected in any of a number of different manners. For example, the mode of operation can be selected at least partially based upon the temperatures of the phase change material and/or the coolant, as well as the temperatures of the cold heat sink, the coils within the air-to-liquid heat exchangers 18 and/or the interiors of the enclosures 11. In addition, the mode of operation can be selected based upon the refrigeration needs of the enclosures, as the enclosures may not require refrigeration in some instances.

To control the mode of operation, the system 10 can additionally include a controller (not shown) electrically connected to the valves V1–V6. In addition, the controller can be electrically connected to temperature sensors (also not shown), which can be mounted in thermal contact with the phase change material, the coolant, the cold heat sink, the coils within the air-to-liquid heat exchangers 18 and/or the interiors of the enclosures 11. Based on temperature information transmitted to the controller from one or more temperature sensors, then, the controller can determine a mode of operation for the system to operate. Thereafter, the controller can operate the valves, as described below, to operate the system in the respective modes. As will be appreciated, as the mode of operation can change, the controller can be adapted to continuously receive temperature information, or alternatively receive temperature information at a predetermined time interval.

To operate the system 10 in direct passive mode, valves V1, V3, V6 are opened to permit coolant to pass through the ducts 13A and 13B connected to the respective valves; and valves V2, V4, V5 are closed to prevent coolant from passing through the ducts connected to the respective valves. With reference to FIG. 3 illustrating an operational block diagram of the system operating in direct passive mode. In operation in direct passive mode, powered by the coolant pumps 20 and 22, coolant passes through loops L1 and L2. As the coolant passes through loop L1, coolant having a temperature less than the internal temperature of the enclosures 11 passes through the air-to-liquid heat exchangers 18, which are in thermal contact with the interiors of respective enclosures.

As the coolant passes through the air-to-liquid heat exchangers 18, the coolant absorbs heat from the interiors of the respective enclosures 11, and thereafter carries the heat away from the enclosures. As the heat is carried away from the interiors, the temperature in the interiors drops, thereby refrigerating the interiors to within a predetermined temperature range. Thereafter, to reject the absorbed heat, the coolant is passed through the ducts 13B to the ducts 13A to the liquid-to-direct heat exchanger 14, which is in thermal contact with the cold heat sink. The coolant then passes through the liquid-to-direct heat exchanger, where the heat is absorbed by the cold heat sink.

Operating the system 10 in direct passive mode advantageously allows the system to utilize an existing, typically passive, cold heat sink (e.g., fuselage skin) of a vehicle (e.g., aircraft) or other system employing the system. In this regard, the system is capable of operating in the direct passive mode as long as the coolant is capable of maintaining a low enough thermodynamic state to facilitate adequate heat transfer out of the enclosures 11. More particularly, the system can advantageously operate in the direct passive mode when the cold heat sink is at a temperature between the temperature of phase change material in the eutectic thermal battery 12 and approximately 0° C.

To operate the system 10 in indirect passive mode, valves V1, V4 and V5 are opened to permit coolant to pass through the ducts 13A and 13B connected to the respective valves; and valves V2, V3 and V6 are closed to prevent coolant from passing through the ducts connected to the respective valves. In this regard, reference is now made to FIG. 4, which illustrates an operational block diagram of the system operating in indirect passive mode. In operation in indirect passive mode, powered by the coolant pump 22, coolant passes through loop L1. As the coolant passes through loop L1, coolant having a temperature less than the internal temperature of the enclosures 11 passes through the air-to-liquid heat exchangers 18, which are in thermal contact with the interiors of respective enclosures.

As the coolant passes through the air-to-liquid heat exchangers 18, the coolant absorbs heat from the interiors of the respective enclosures 11, and thereafter carries the heat away from the enclosures. As the heat is carried away from the interiors, the temperature in the interiors drops, thereby refrigerating the interiors to within a predetermined temperature range. Thereafter, to reject the absorbed heat, the coolant is passed through the ducts 13B to the eutectic thermal battery 12 where the coolant then passes through the eutectic thermal battery. In this regard, as the coolant passes through the eutectic thermal battery, the phase change material in the eutectic thermal battery absorbs the heat from the coolant, thereby decreasing the temperature of the coolant. With the coolant loop L1 typically comprising a closed loop, the process can then repeat, beginning with the coolant passing back through the air-to-liquid heat exchangers.

When the cold heat sink (e.g., aircraft fuselage skin structure) temperature is lower than the phase change material, circulation of coolant in loop L2 is enabled to remove the heat from the phase change material. Powered by coolant pump 20, coolant passing through the eutectic thermal battery 12 in loop L2 absorbs the heat in the phase change material. Thereafter, the coolant passes through the ducts 13A to the liquid-to-direct heat exchanger 14, which is in thermal contact with the cold heat sink. The coolant then passes through the liquid-to-direct heat exchanger, where the heat is absorbed by the cold heat sink.

By removing the heat from the phase change material, the phase change material in the eutectic thermal battery 12 can be maintained as either a liquid-solid mixture or a slightly sub-freezing solid as the phase change material absorbs heat from the coolant flowing in loop L1 and rejects the heat to the cold heat sink via coolant flowing through loop L2. In this regard, the system 10 can manage the phase change material phase mixture by controlling the coolant flow rates through loops L1 and L2 as the coolant passes through the eutectic thermal battery, as will be appreciated by those skilled in the art. The objective, then, is to maintain isothermal heat transfer between the coolant in loop L1 and the phase change material, and the phase change material and the coolant in loop L2. Advantageously, by maintaining isothermal heat transfer in the eutectic thermal battery, the system can refrigerate the interior of the enclosures without causing the consumables in the enclosures to freeze.

In some instances, such as when the enclosures 11 do not contain any consumables and maintenace of the temperature within the enclosures is not needed, the system 10 can allow the phase change material in the eutectic thermal battery 12 to reach a sub-freezing solid state, which can provide extra refrigeration capacity for ground operation during airport turnaround service. To allow the phase change material to reach a sub-freezing solid state, the valves can be operated to permit continuous flow of coolant through coolant loop L2 until the phase change material in the euctectic thermal battery 12 reaches the desired temperature.

Operating the system 10 in indirect passive mode advantageously allows the system to utilize an existing, typically passive, cold heat sink (e.g., fuselage skin) of a vehicle (e.g., aircraft) or other system employing the system. In this regard, the system is capable of operating in the indirect passive mode as long as the phase change material in the eutectic thermal battery 12 is capable of maintaining a low enough thermodynamic state to facilitate adequate heat transfer out of the enclosures 11. As will be appreciated, however, the thermodynamic state of the phase change material in some instances is too high to enable the system to operate in the indirect passive mode. For example, in instances where the vehicle comprises an aircraft and the cold heat sink comprises the aircraft fuselage skin, such an occasion might be representative of an instance where the aircraft is scheduled for revenue service after maintenance. Additionally, for example, abnormally long delays in airport turnaround service can also potentially exhaust the refrigeration capacity of the eutectic thermal battery 12. In such instances, the system is advantageously capable of operating in a direct active mode and/or an indirect active mode to provide continuous refrigeration to the enclosures, as such may be determined by the aforementioned controller.

In either direct or indirect active mode, the system 10 is capable of utilizing the liquid-to-direct heat pumps 16. As indicated above, the liquid-to-direct heat pumps can be located in any number of different locations in thermal contact with the cold heat sink (e.g., fuselage skin structure). To utilize the liquid-to-direct heat pumps, then, the liquid-to-direct heat pumps are connected to the eutectic thermal battery 12 via a series of ducts 13 within coolant loop L2, and connected to the air-to-liquid heat exchangers 18 in the enclosures 11 via a series of ducts within coolant loops L1 and L2.

In direct active operation, coolant is circulated between the liquid-to-direct heat pumps 16 and the air-to-liquid heat exchangers 18 in the enclosures 11 via coolant loops L1 and L2. Thus, to operate the system in direct active mode, valves V2, V3 and V6 are opened to permit coolant to pass through the ducts 13 connected to the respective valves; and valves V1, V4 and V5 are closed to prevent coolant from passing through the ducts connected to the respective valves. Reference is now made to FIG. 5, which illustrates an operational block diagram of the system operating in direct active mode.

During operation of the system 10 in direct active mode, direct coolant circulation is enabled between the air-to-liquid heat exchangers 18 and the liquid-to-direct heat pumps 16. Powered by one or both coolant pump 20 and coolant pump 22, coolant is passed through the air-to-liquid heat exchangers, which are in thermal contact with the interiors of the respective enclosures 11. Like during indirect passive mode operation, when the coolant passes through the air-to-liquid heat exchangers, the coolant absorbs heat from the interiors of the respective enclosures, and thereafter carries the heat away from the enclosures. As the heat is carried away from the interiors of the enclosures, the temperature in the interiors drops, thereby refrigerating the interiors to a predetermined temperature.

To reject the heat absorbed by the coolant in the direct active mode, the coolant is passed through portions of ducts 13A and 13B to the liquid-to-direct heat pumps 16. The coolant then passes through the liquid-to-direct heat pumps, which are in thermal contact with the cold heat sink (e.g., aircraft fuselage skin structure). As the coolant passes through the liquid-to-direct heat pumps, the heat is rejected to the cold heat sink. As will be appreciated, in instances in which the system 10 operates in active mode (either direct or indirect), the temperature of the cold heat sink may not be sufficiently low to passively absorb heat from the coolant. As such, the liquid-to-direct heat pumps are capable of forcing the transfer of heat from the coolant to the cold heat sink, as such is well known to those skilled in the art. After the heat in the coolant is rejected to the cold heat sink, the process can be repeated, beginning with the coolant passing back through the air-to-liquid heat exchangers 18.

In an alternative embodiment shown in FIG. 6, the system 10 can include or otherwise access a store 24 of a compressed inert composition, such as compressed nitrogen, nitrogen-enriched air, carbon dioxide or the like. In this regard, the system can operate in direct active mode by expanding the compressed inert composition to ambient atomspheric pressure. To utilize the store of inert composition, the euctectic thermal battery 12 can include an evaporator coil 26, which is in variable fluid contact with the store, such as via a throttling valve 28. To operate the system 10 in direct active mode in this alternative embodiment, then, valve V5 is opened to permit coolant to pass through the ducts 13 connected to the respective valves; and valves V1, V2, V3, V4 and V6 are closed to prevent coolant from passing through the ducts connected to the respective valves. Also, during operation of the system in this embodiment, the throttling valve is controllably opened and closed, as described below. In this regard, reference is now made to FIG. 7, which illustrates an operational block diagram of the system operating in direct active mode in embodiments including the store of inert composition.

In direct active operation according to the embodiment of FIGS. 5 and 6, powered by the coolant pump 22, coolant passes through loop L1 in a manner similar to that during operation of the system 10 in indirect passive mode. In this regard, coolant having a temperature less than the internal temperature of the enclosures 11 passes through the air-to-liquid heat exchangers 18 where the coolant absorbs heat from the interiors of the respective enclosures, and thereafter carries the heat away. As the heat is carried away from the interiors, the temperature in the interiors drops, thereby refrigerating the interiors to within a predetermined temperature range. Thereafter, to reject the absorbed heat, the coolant is passed through the ducts to the eutectic thermal battery 12 where the phase change material in the eutectic thermal battery absorbs the heat from the coolant, thereby decreasing the temperature of the coolant. The process can then repeat, beginning with the coolant passing back through the air-to-liquid heat exchangers 18.

To reject the absorbed heat from the phase change material, the inert composition can be expanded through the throttling valve 28 into the evaporator coil 26 inside the eutectic thermal battery 12. The super-cold composition can then act as a very powerful refrigerant to cool the phase change material. In this regard, the phase change material in the eutectic thermal battery typically gradually freezes as the latent heat of fusion of the phase change material is lost to the cold nitrogen vapor through the walls of the evaporator coil. The eutectic thermal battery can then provide adequate refrigeration to the enclosures, with the temperature of the phase change material typically maintained at or slightly below the freezing point of the phase change material. After cooling the phase change material, the spent composition can be ejected out of the aircraft, such as via an air hose connecting the evaporator coil to a purge valve 30 mounted to the aircraft skin structure.

Advantageously, as used in vehicles such as aircraft, the system 10 need not include the store of inert composition. In such instances, the system may utilize a store of inert composition existing onboard the aircraft for other purposes, such as preventing fuel tank explosion. As is well known to those skilled in the art, liquid nitrogen has historically been used on aircraft for galley refrigeration. Such a practice has decreased in recent years due to the expanse of carrying liquid nitrogen tanks onboard aircraft. A recent Federal Aviation Administration (FAA) requirement to prevent fuel tank explosion, however, may necessitate that aircraft provide means to inert the atmosphere inside the aircraft fuel tanks. In this regard, nitrogen gas or nitrogen-enriched air are considered by many as the leading candidates to be used as the innerting agent inside aircraft fuel tanks. As such, future aircraft may be required to have either ground-based or aircraft-based nitrogen storage or generation capability, which the system can utilize to absorb heat from the phase change material.

Again referring to FIG. 1 as indicated above, in addition to operating in the passive or direct active modes, the system 10 can operate in an indirect active mode. In this regard, active mode can be triggered in situations, for example, when passive refrigeration is not possible due to the temperature of the cold heat sink and current refrigeration of the enclosures 11 is not necessary, but cooling the phase change material is desired to "store" thermal energy for subsequent refrigeration of the enclosures. To operate the system in indirect active mode according to one embodiment, valves V2 and V4 are opened to permit coolant to pass through the ducts 13 connected to the respective valves; and valves V1, V3, V5 and V6 are closed to prevent coolant from passing through the ducts connected to the respective valves. Reference is now made to FIG. 8, which illustrates an operational block diagram of the system operating in indirect active mode. As seen then, during operation of the system in indirect active mode, coolant circulation bypasses the liquidto-direct heat exchanger 14 and the air-to-liquid heat exchangers 18 in thermal contact with the interiors of respective enclosures 11.

During operation in indirect active mode, like during operation in indirect passive mode, coolant is passed through the eutectic thermal battery 12 to absorb the heat in the phase change material. Thereafter, the coolant passes through the ducts 13 and through the liquid-to-direct heat pumps 16, which are in thermal contact with the cold heat sink (e.g., aircraft fuselage skin structure). As the coolant passes through the liquid-to-direct heat pumps, the liquid-to-direct heat pumps reject the heat in the coolant to the cold heat sink. After the heat in the coolant is rejected to the cold heat sink, the process can be repeated, beginning with the coolant passing back through the eutectic thermal battery. By operating the system 10 in the indirect active mode, the phase change material in the eutectic thermal battery can be cooled, typically to the point of freezing, such that the system can thereafter operate in the indirect passive mode to refrigerate the interiors of the enclosures.

As described above according to various embodiments of the present invention, the system 10 can controllably operate in either a direct passive mode, an indirect passive mode, direct active mode (with or without utilizing an inert composition) or an indirect active mode. For a summary of the state of the various valves of the system (i.e., V1–V6) during operation of the system in the different modes, see Table 1 below.

TABLE 1

| Valve | Direct Passive Mode | Indirect Passive Mode | Direct Active Mode | Direct Active Mode (Inert Gas) | Indirect Active Mode |
|---|---|---|---|---|---|
| V1 | Open | Open | Closed | Closed | Closed |
| V2 | Closed | Closed | Open | Closed | Open |
| V3 | Open | Closed | Open | Closed | Closed |
| V4 | Closed | Open | Closed | Closed | Open |
| V5 | Closed | Open | Closed | Open | Closed |
| V6 | Open | Closed | Open | Closed | Closed |

It should be noted that although the foregoing may have described the modes of operation of the system 10 as depending on separate instances, the system can operate in any mode at any instance, subject only to the thermodynamic state (or temperature) of the cold heat sink. For example, the system can operate in either the direct active or indirect active modes at instances in which the system can equally operate in the indirect passive mode.

It should also be understood that whereas the system may include the various elements as described herein, the system may additionally or alternatively incorporate other valves, reservoirs, demineralizers, accumulators, heat exchangers, heat pumps, sensors, other flow loop control and instrumentation devices or the like as may be required by the system to maintain temperature, flow rate, and pressure of the coolant and/or phase change material within prescribed limits. For example, the system 10 can comprise the elements as shown in FIG. 6, but not include the liquid-to-direct heat pumps 16 or valve V2, as shown in FIG. 9. In place of the liquid-to-direct heat pumps, then, the system could include an air-to-liquid heat pump 19 in thermal contact with each enclosure 11, along with additional valves V7 and V8 controlling the flow of coolant to the air-to-liquid heat exchangers 18 and air-to-liquid heat pumps. In an indirect active mode, valve V7 can be closed and valve V8 opened to control the flow of coolant through the air-to-liquid heat pumps. As such, the air-to-liquid heat pumps can force the transfer of heat from the interior of the enclosures to the coolant, which can thereafter be absorbed by the cold heat sink via the liquid-to-direct heat exchanger 14.

It is also noted that the present invention can include common heat sinks through which multiple devices can thermally communicate with each of the enclosures 11. For example, as illustrated in FIG. 9, each enclosure 11 is provided with the heat exchanger 18 and the heat pump 19, and the heat exchanger 18 and heat pump 19 can be used independently to remove heat from the enclosure 11. The heat exchanger 18 and heat pump 19 associated with each enclosure 11 can be provided as separate devices, as illustrated in FIG. 9, each including a heat sink 41, 42 for thermally communicating with the interior of the enclosure 11. Alternatively, as illustrated in FIG. 10, each enclosure 11 can include a common or primary heat sink 40, i.e., a heat sink that is configured to thermally communicate with the enclosure 11 and reject heat therefrom to each of the heat exchanger 18 and heat pump 19 associated with the respective enclosure 11. The common heat sink 40 can have a cooling capacity, determined in part by the size of the heat sink 40, that is sufficiently great for removing heat from the enclosure 11 at a desired, or predetermined, cooling rate, e.g., to maintain the enclosure 11 at a particular temperature under particular operating conditions. Each of the heat exchanger 18 and the heat pump 19 can be configured to achieve the desired cooling of the enclosure 11 through the common heat sink 40, i.e., each heat exchanger 18 and heat pump 19 can be paired with one of the common heat sinks 40 in communication with a respective one of the enclosures 11 and configured to remove heat from the heat sink 40 at a rate sufficient to achieve the desired rate of cooling of the enclosure 11.

In some embodiments of the present invention, the common heat sink 40 can have a cooling capacity that is less than the combined cooling capacity of multiple heat sinks that would otherwise be required if each heat exchanger 18 and heat pump 19 communicated with the enclosure 11 via separate heat sinks, e.g., the heat sinks 41, 42 illustrated in FIG. 9. That is, the common heat sink 40 can have less cooling capacity than the combination of heat sinks 41, 42 that would otherwise be provided separately for the heat exchanger 18 and heat pump 19, respectively, to achieve the same rate of cooling by each device 18, 19. In particular, if separate heat sinks are used for each device, each heat sink will need to have a minimum cooling capacity, and as a result the cumulative cooling capacity of the heat sinks may be much greater than would otherwise be required in a configuration having a single heat sink with both devices connected thereto. Each device requires a heat sink having a cooling capacity sufficient for cooling the respective enclosure at a desired cooling rate. If the devices are attached to separate heats sinks, the combined cooling capacity of two or more separate heat sinks will therefore be about twice the required cooling capacity of the common heat sink 40 of the present invention that is designed to cool the enclosure 11 at the same cooling rate. To illustrate, in FIG. 9 the heats sinks 41, 42 attached to the heat pumps 19 and heat exchangers 18 are depicted as having a certain cross sectional area, and the common heat sink 40 attached to the heat pump 19 and heat exchanger 18 has a cross-sectional area of about half of that of the combined heat sink area of the heat sinks 41, 42 depicted in FIG. 9. Although surface area of a heat sink in these figures is not intended to precisely correspond with its cooling capacity, the figures are intended to illustrate the concept that the cooling capacity of the common heat sink 40 of FIG. 10 may be about half of the cooling capacity of the combined cooling capacity of the heat sinks 41, 42 depicted in FIG. 9. Thus, in some embodiments of the present invention, the common heat sink 40 has a cooling capacity that is less than twice the total cooling capacity that would otherwise be required if two or more separate heat sinks were used to obtain the same cooling performance, and in some embodiments, the common heat sink 40 has less than 150% of the cooling capacity that would otherwise be required. Advantageously, the common heat sink 40 can be smaller and lighter than the combination of the separate heat sinks 41, 42 that would otherwise be required, as the cooling capacity of the heat sinks are generally determined at least partly by size and, hence, weight. In the case of refrigeration units for airplane galley carts, which are often less insulated than other types of refrigerated enclosures and typically require relatively high cooling capacities, the use of the common heat sink(s) 40 allows an optimal match between the actual cooling capacity requirement of the enclosure 11 and the net cooling capacity and physical size of the heat sink(s) in direct thermal communication with the enclosure 11. This can result in significant weight and volume savings.

Systems, apparatuses, and methods for refrigerating an enclosure using a common or primary heat sink for multiple devices are further described in U.S. patent application Ser. No. 10/641,415, entitled "System, Apparatus, and Methods for Passive and Active Refrigeration of at Least One Enclosure," filed on Aug. 15, 2003, the entirety of which is incorporated herein by reference.

Therefore, the system and method of the present invention are capable of refrigerating one or more enclosures utilizing the "free" thermal potential provided by the natural cold heat sink of a vehicle or system with which the system is operated. Advantageously, when the system and method are operated onboard an aircraft, for example, the system and method can refrigerate enclosures, such as galley carts on aircraft, without the use of a vapor-compression-cycle air chiller, thereby avoiding the drawbacks of the vapor-compression-cycle air chiller. The system and method of embodiments of the present invention are based on a hybrid refrigeration methodology capable of integrating passive and active cooling technologies to provide continuous refrigeration to enclosures, such as aircraft galley carts.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method of refrigerating at least one enclosure comprising:
    refrigerating at least one interior of the at least one enclosure in a plurality of consecutive modes comprising at least a direct passive mode, an indirect passive mode, a direct active mode and an indirect active mode, wherein the mode of refrigerating is selected at least partially based upon a temperature of a phase change material, and wherein refrigerating the at least one interior in the indirect passive mode comprises:
        placing a coolant in a first coolant loop in thermal communication with the at least one interior such that the coolant carries heat away from the at least one interior;
        absorbing the heat carried away by the coolant in the first coolant loop, wherein the heat is absorbed by the phase change material;
        placing a coolant in a second coolant loop in thermal communication with the phase change material such that the coolant carries away the absorbed heat; and
        placing the coolant in the second coolant loop in thermal communication with a cold heat sink such that the cold heat sink absorbs the heat carried by the coolant.

2. A method according to claim 1, wherein refrigerating the at least one interior in the direct passive mode comprises:
    placing a coolant in the first coolant loop in thermal communication with the at least one interior such that the coolant carries heat away from the at least one interior;
    receiving the coolant into the second coolant loop and thereafter placing the coolant in the second coolant loop in thermal communication with the cold heat sink such that the cold heat sink absorbs the heat carried by the coolant wherein the cold heat sink comprises at least a portion of an aircraft fuselage skin structure.

3. A method according to claim 1, wherein refrigerating the at least one interior in the direct active mode comprises:
    placing the coolant in the first coolant loop in thermal communication with the at least one interior such that the coolant carries heat away from the at least one interior; and
    rejecting the heat carried by the coolant in the first coolant loop to the cold heat sink.

4. A method according to claim 3, wherein refrigerating the at least one interior in the indirect active mode comprises:
    placing the coolant in the second coolant loop in thermal communication with the phase change material such that the coolant carries away heat from the phase change material; and
    rejecting the heat carried by the coolant in the second coolant loop to the cold heat sink.

5. A method according to claim 3, wherein refrigerating the at least one interior in the direct active mode comprises:
    placing the coolant in the first coolant loop in thermal communication with the at least one interior such that the coolant carries heat away from the at least one interior;
    absorbing the heat carried away by the coolant in the first coolant loop, wherein the heat is absorbed by the phase change material; and
    expanding a pressurized inert composition into thermal communication with the heat absorbed from the coolant in the first coolant loop such that the inert composition carries away the absorbed heat.

6. A system for refrigerating at least one enclosure comprising:
    at least one air-to-liquid heat pump capable of placing a coolant in a coolant loop in thermal communication with at least one interior of the at least one enclosure such that the at least one air-to-liquid heat pump can reject heat from the at least one interior to the coolant to thereby permit the coolant to carry the heat away from the at least one interior;
    a liquid-to-direct heat exchanger capable of receiving the coolant in the coolant loop; and a cold heat sink in thermal communication with the liquid-to-direct heat exchanger, wherein the cold heat sink is capable of absorbing the heat carried by the coolant received by the liquid-to-direct heat exchanger, and wherein the cold heat sink comprises at least a portion of an aircraft fuselage skin structure.

7. A system for refrigerating at least one enclosure at a predetermined rate of cooling, the system comprising:

a heat sink in thermal communication with the at least one enclosure;

at least one air-to-liquid heat exchanger capable of placing a coolant in a first coolant loop in thermal communication with at least one interior of the at least one enclosure via the heat sink such that the coolant can carry heat away from the at least one interior and thereby cool the at least one enclosure at the predetermined rate of cooling; and at least one air-to-liquid heat pump capable of placing a coolant in a second coolant loop in thermal communication with the at least one interior of the at least one enclosure via the heat sink such that the at least one air-to-liquid heat pump can reject heat from the at least one interior to the coolant to thereby permit the coolant to carry the heat away from the at least one interior and thereby cool the at least one enclosure at the predetermined rate of cooling, wherein the heat sink has a cooling capacity of less than about 150% of a cooling capacity required for cooling the at least one enclosure at the predetermined rate of cooling.

8. A system according to claim 7, further comprising a eutectic thermal battery including a phase change material, wherein the eutectic thermal battery is capable of receiving the coolant from each air-to-liquid heat exchanger and air-to-liquid heat pump and thereafter placing the coolant in thermal communication with the phase change material such that the phase change material can absorb the heat carried away by the coolant in the first and second coolant loops.

9. A system according to claim 7, further comprising:

a liquid-to-direct heat exchanger capable of receiving the coolant in the first and second coolant loops; and a cold heat sink in thermal communication wit the liquid-to-direct beat exchanger, wherein the cold heat sink is capable of absorbing the heat carried by the coolant received by the liquid-to-direct heat exchanger, and wherein the cold heat sink comprises at least a portion of an aircraft fuselage skin structure.

* * * * *

UNITED STATES PATENT AND TRADEMARK OFFICE
CERTIFICATE OF CORRECTION

| | | |
|---|---|---|
| PATENT NO. | : 7,089,756 B2 | Page 1 of 1 |
| APPLICATION NO. | : 10/649716 | |
| DATED | : August 15, 2006 | |
| INVENTOR(S) | : Hu | |

It is certified that error appears in the above-identified patent and that said Letters Patent is hereby corrected as shown below:

<u>Column 18,</u>
Line 18, "wit" should read --with--;
Line 19, "beat" should read --heat--.

Signed and Sealed this

Ninth Day of January, 2007

JON W. DUDAS
*Director of the United States Patent and Trademark Office*